United States Patent
Thakore et al.

(10) Patent No.: US 8,687,442 B1
(45) Date of Patent: Apr. 1, 2014

(54) DELAY MATCHING ACROSS SEMICONDUCTOR DEVICES USING INPUT/OUTPUT PADS

(75) Inventors: Priyanka Thakore, San Jose, CA (US); Meng-Kun Lee, Cupertino, CA (US)

(73) Assignee: SK hynix memory solutions inc., San Jose, CA (US)

( * ) Notice: Subject to any disclaimer, the term of this patent is extended or adjusted under 35 U.S.C. 154(b) by 276 days.

(21) Appl. No.: 13/291,629

(22) Filed: Nov. 8, 2011

Related U.S. Application Data

(60) Provisional application No. 61/473,664, filed on Apr. 8, 2011.

(51) Int. Cl.
*G11C 7/00* (2006.01)

(52) U.S. Cl.
USPC .............. 365/194; 365/51; 365/191; 365/198

(58) Field of Classification Search
USPC .......... 365/51 X, 63, 189.11, 189.15, 189.18, 365/189.05, 51, 191 X, 194 O, 198 X, 191, 365/194, 198
See application file for complete search history.

(56) References Cited

U.S. PATENT DOCUMENTS

| | | | |
|---|---|---|---|
| 7,132,696 B2* | 11/2006 | Ward | 257/127 |
| 7,230,863 B2* | 6/2007 | Huang et al. | 365/194 |
| 2005/0232053 A1* | 10/2005 | Azuma et al. | 365/226 |

OTHER PUBLICATIONS

Hynix Semiconductor et al., "Open NAND Flash Interface Specification", Feb. 27, 2008, pp. 5, 47-48 & 63-66.

* cited by examiner

*Primary Examiner* — Vanthu Nguyen
(74) *Attorney, Agent, or Firm* — Van Pelt, Yi & James LLP

(57) ABSTRACT

A data signal is sampled by generating a read enable signal at a first semiconductor device which is intended for a second semiconductor device. A read enable signal with at least some I/O pad delay included is obtained, including by passing the read enable signal intended for the second semiconductor device at least partially through an input/output (I/O) pad on the first semiconductor device. At the first semiconductor device, a data signal from the second semiconductor is sampled using the read enable signal with at least some I/O pad delay included.

20 Claims, 9 Drawing Sheets

DELAY MATCHING ACROSS SEMICONDUCTOR DEVICES USING INPUT/OUTPUT PADS

CROSS REFERENCE TO OTHER APPLICATIONS

This application claims priority to U.S. Provisional Patent Application No. 61/473,664 entitled DYNAMIC DATA INPUT FROM NAND DEVICE FOR ASYNCHRONOUS MODE ACROSS VARIOUS PROCESS CORNERS filed Apr. 8, 2011 which is incorporated herein by reference for all purposes.

BACKGROUND OF THE INVENTION

Storage systems, such as NAND Flash storage systems, often include multiple semiconductor devices mounted on a printed circuit board (PCB). Since the semiconductor devices may be manufactured by different companies and/or a systems manufacturer may want to have two suppliers provide the same component (e.g., in order to mitigate supply chain interruption and/or to play different suppliers off of each other), a semiconductor device often has timing constraints or specifications associated with its inputs and outputs. For example, a semiconductor device may guarantee to hold a signal steady on a line for a certain period of time, during which another semiconductor device can read back or otherwise sample the held signal on the line. Timing closure is the verification process performed during the design cycle where designers ensure one semiconductor device properly samples a signal from another device during this guaranteed window. A semiconductor device may not operate properly if (for example) it samples a signal outside of a guaranteed window. It would be desirable if new techniques which make timing closure easier were developed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
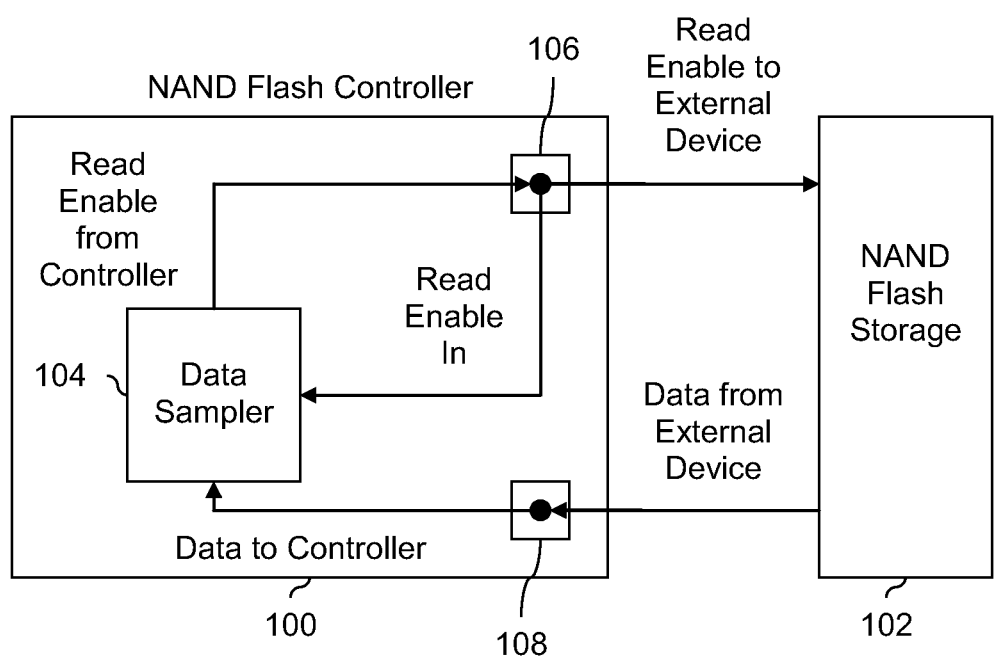
FIG. 1 is a diagram showing an embodiment of a NAND Flash controller configured to sample data using a read enable signal which includes at least some input/output (I/O) pad delay.

FIG. 1 is a diagram showing an embodiment of a NAND Flash controller configured to sample data using a read enable signal which includes at least some input/output (I/O) pad delay. In the example shown, NAND Flash controller 100 and NAND Flash storage 102 are two different semiconductor devices on a common PCB. NAND Flash controller 100 and NAND Flash storage 102 may be referred to as "chips." In various embodiments, NAND Flash controller 100 is implemented using an application-specific integrated circuit (ASIC), a field-programmable gate array (FPGA) and/or a (e.g., embedded) microprocessor. NAND Flash controller 100 includes a write processor (not shown) which is configured to perform processing related to storing data in NAND Flash storage 102 (e.g., error correction encoding, modulating a signal to be stored based on a particular error correction code used and/or anticipated channel, etc.) and a read processor (not shown) which is configured to perform processing related to reading data stored in NAND Flash storage 102 (e.g., error correction decoding, demodulation, equalization, timing correction, etc.).

NAND Flash controller 100 include data sampler 104. In some embodiments, data sampler 104 is part of a read controller (not shown). Data sampler 104 in this example generates a read enable signal to be sent to NAND Flash storage 102 (in the diagram this signal is referred to as the read enable from controller signal). This signal is passed to read enable I/O pad 106 from data sampler 104. An I/O pad in a semiconductor device is designed to interface with an off-chip signal (e.g., routed across at least some of the PCB board to one or more other semiconductor devices). Typically, I/O pads are placed at the perimeter of the semiconductor die and include various direction types such as (strictly) input, (strictly) output and bidirectional. Unlike an I/O pad, an internal buffer is designed to input and output signals which stay strictly on-chip. As a result, I/O pads tend to be much larger, have much greater drive strengths and have much longer delays compared to internal buffers.

From read enable I/O pad 106, the signal is passed to NAND Flash storage 102 (i.e., the read enable to external device signal in FIG. 1). In response to the read enable to external device signal, NAND Flash storage 102 outputs the requested data on the data bus (in the figure, the signal is referred to as data from external device). The timing of the return of the requested data is specified by the NAND Flash vendor, for example as a max delay parameter. In various embodiments, various levels or transitions cause NAND Flash storage 102 to return data. In level-sensitive applications, for example, a high/low level of the read enable signal causes data to be returned from NAND Flash storage 102, whereas in edge-sensitive applications, a rising/falling edge causes data to be returned from NAND Flash storage 102.

The data from the external device is input to NAND Flash controller 100 via data I/O pad 108. Data I/O pad 108 outputs a data to controller signal and data sampler 104 uses this signal to sample the data. Sampling of the data to controller signal is performed using the read enable in signal, which includes at least some I/O pad delay from read enable I/O pad 106. An example of a read enable I/O pad and how the read enable in signal is obtained is described in further detail below. Although this figure shows data I/O pad in input mode, in some embodiments a data I/O pad is a bidirectional pad (e.g., which is put into an output mode when NAND Flash controller 100 writes data to NAND Flash storage).

By sampling the data using the using the read enable in signal (which includes at least some I/O pad delay), timing closure is easier to achieve compared to using a read enable signal which does not include at least some I/O pad delay (e.g., sampling data using the read enable from controller signal, prior to read enable I/O pad 106). Some example timing diagrams demonstrating this are described in further detail below.

Some other techniques may attempt to use a delay chain comprised solely of internal buffers or repeaters to introduce delay into a read enable signal. The amount of propagation delay through an internal buffer is relatively small compared to the propagation delay through an I/O pad and it may require hundreds or thousands of internal buffers to match the propagation delay of an I/O pad. As such, it may be preferable to use an I/O pad to introduce delay into a read enable signal as opposed to relying solely upon internal buffers to do so since the number of internal buffers required may be relatively high and/or take up valuable space. Furthermore, since internal buffers are located in the interior of a die and I/O pads are located along the periphery of a die, they may experience different processes, voltages and/or temperatures which result in different performance corners and a variable or configurable number of internal buffers may be required to adjust based on the process, voltage and/or temperature experienced. Naturally, the techniques described herein do not preclude the use of an internal buffer in combination with an I/O pad to generate a read enable signal (with delay due to an I/O pad as well as an internal buffer) which is then used to sample data from another semiconductor device.

In some embodiments, the exemplary read enable signals and returned data are associated with an asynchronous mode of operation related to NAND devices, sometimes referred to as a legacy mode. In this mode there is no data valid or data strobe signal, which poses a challenge in correctly and consistently sampling the data from NAND Flash storage 102. Although not shown in this figure, there may be other signals between NAND Flash controller 100 and NAND Flash storage 102, such as chip enable (CE), address latch enable (ALE), command latch enable (CLE) and write enable (WE).

Although the examples described herein show a storage application (specifically, NAND Flash storage), the sampling technique described herein is not necessarily limited to that particular application. The technique may be employed in any application where one semiconductor device returns a signal to another semiconductor device according to some predefined timing.

Figure 2:
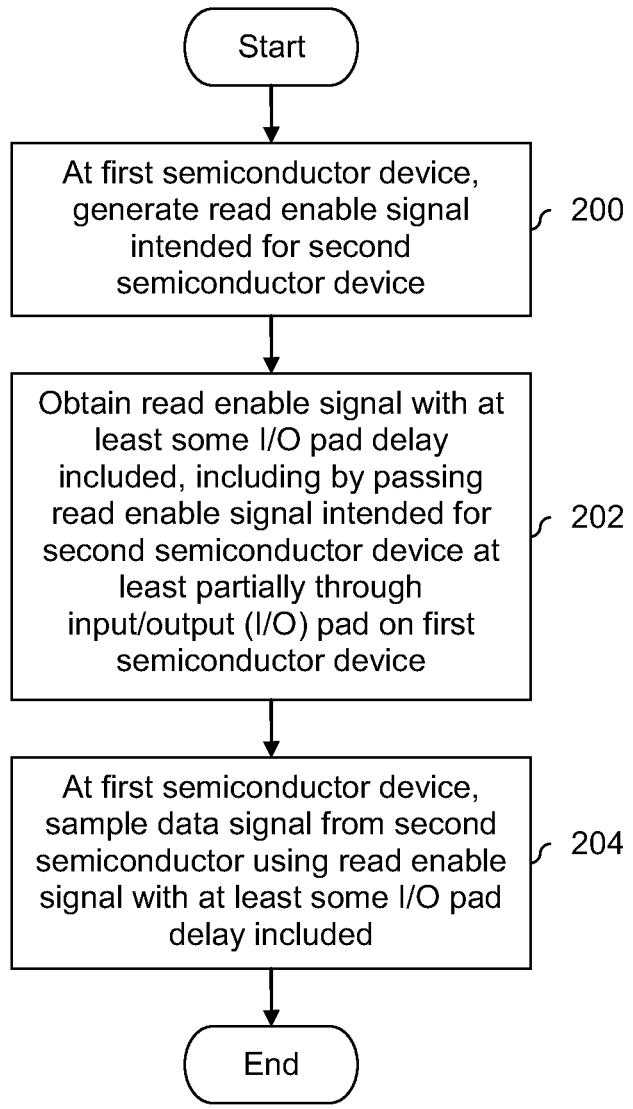
FIG. 2 is flowchart illustrating an embodiment of a process to sample data using a read enable signal with at least some I/O pad delay.

FIG. 2 is flowchart illustrating an embodiment of a process to sample data using a read enable signal with at least some I/O pad delay. In some embodiments, a read controller uses the example process to sample data returned from another semiconductor device.

At 200, a read enable signal which is intended for a second semiconductor device is generated at a first semiconductor device. For example, in FIG. 1, NAND Flash controller 100 wants to access data stored in NAND Flash storage 102 and NAND Flash storage 102 is designed to return data in response to a read enable signal. NAND Flash controller 100 generates a read enable signal intended for NAND Flash storage 102.

A read enable signal with at least some I/O pad delay included is obtained by passing the read enable signal intended for the second semiconductor device at least partially through an I/O pad on the first semiconductor device at 202. For example, the read enable in signal includes at least some delay from read enable I/O pad 106 in FIG. 1.

At 204, at the first semiconductor device, a data signal from a second semiconductor is sampled using the read enable signal with at least some I/O pad delay included. In FIG. 1 for example, data sampler 104 uses the read enable in signal (which includes at least some I/O pad delay from read enable I/O pad 106) to sample the data to controller signal.

Other techniques have difficulties with timing closure because of on-chip variations. Variations in process, voltage and temperature (PVT) may result in variations in speed so that one semiconductor device runs faster than another, even if they have identical designs. Process refers to the semiconductor manufacturing process and variations that result from it. Some examples include transistor channel widths, an amount of doping, the thickness of a semiconductor layer, etc. These (typically slight) differences may result in a transistor turning on/off faster than another transistor. When combined across many transistors, this has an overall effect of one semiconductor device running faster than another. Similarly, increasing voltage causes a semiconductor device to run faster and decreasing temperature causes a semiconductor device to run faster. The following figures show example timing differences due to on-chip variations to demonstrate some example benefits of the sampling technique described herein.

In some embodiments, a NAND Flash controller communicates with a plurality of NAND Flash storage devices. I/O pads have different delays across different chips, each of which has its own process corners. As such, the sampling technique described herein addresses not only on-chip variation on the same chip but across different chips. Variations cause I/O pad delays to be significantly different making a single edge not work across all NAND Flash storage devices.

Figure 3A:
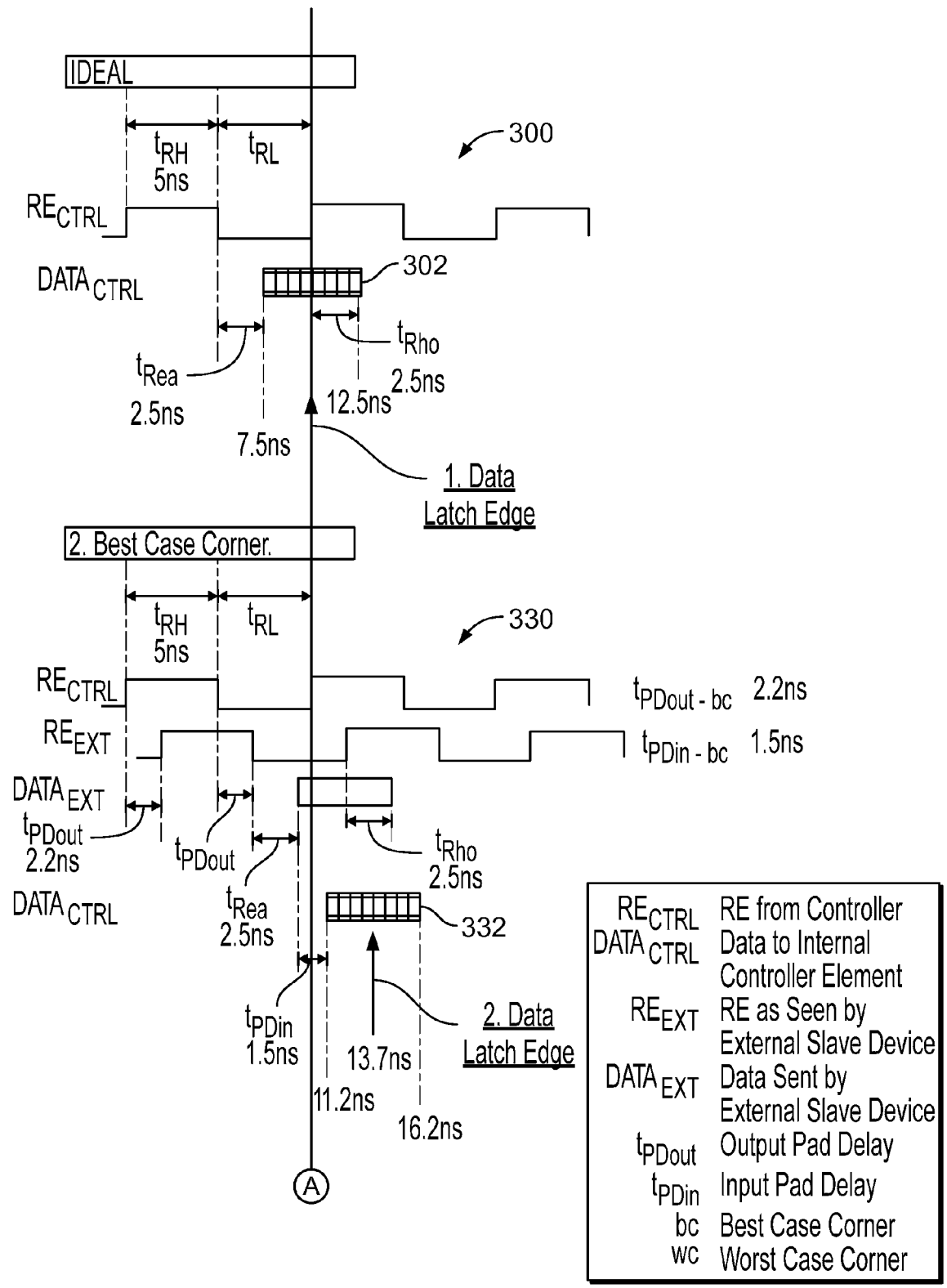
FIG. 3A shows example ideal and best case timing diagrams where a data signal is sampled using a read enable signal which does not include at least some delay from an I/O pad.
Figure 3B:
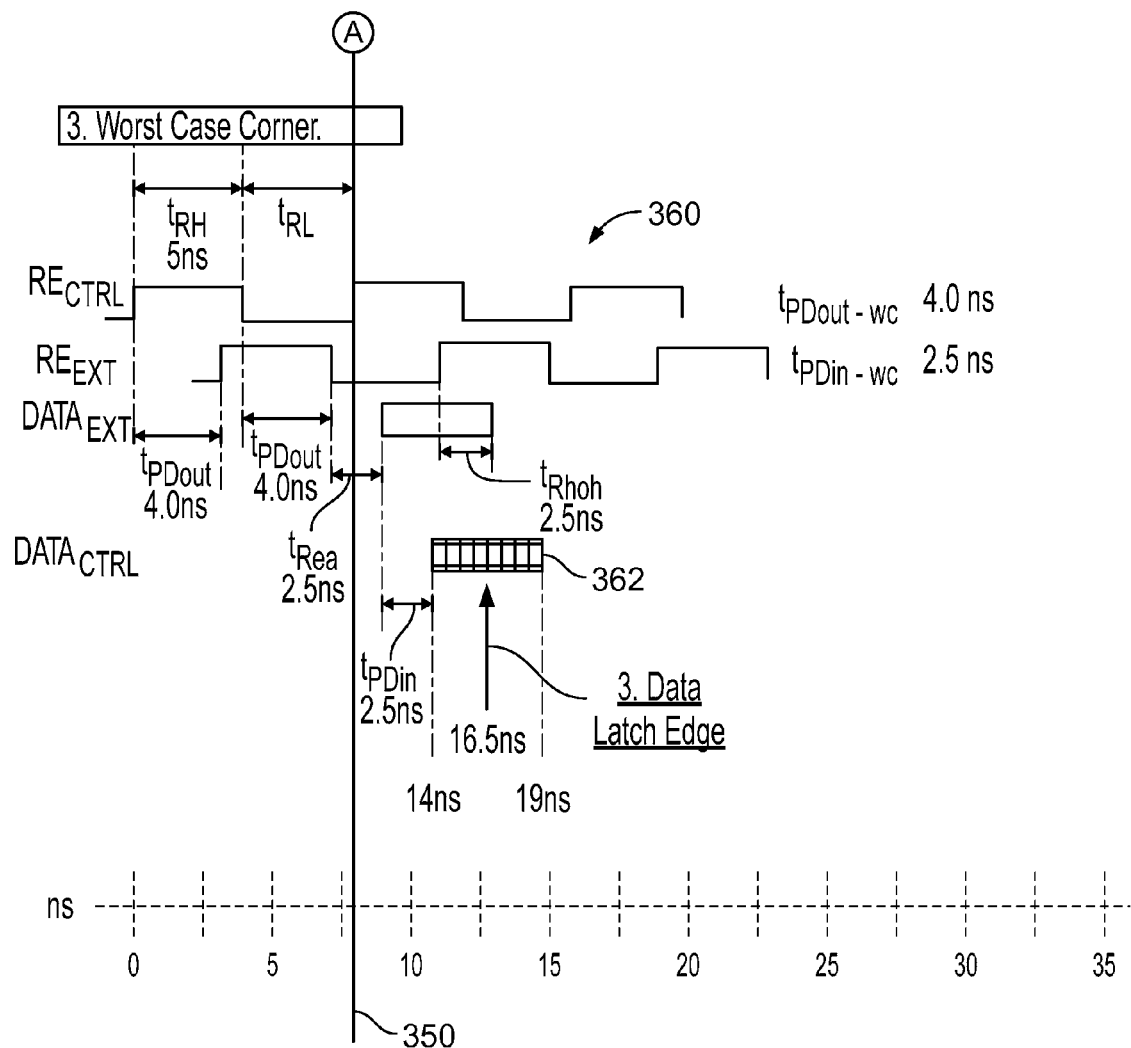
FIG. 3B shows an example worst case timing diagram where a data signal is sampled using a read enable signal which does not include at least some delay from an I/O pad.

FIG. 3A shows example ideal and best case timing diagrams where a data signal is sampled using a read enable signal which does not include at least some delay from an I/O pad. FIG. 3B shows an example worst case timing diagrams where a data signal is sampled using a read enable signal which does not include at least some delay from an I/O pad. In the example shown, diagram 300 shows an ideal timing diagram, diagram 330 shows a best case timing diagram and diagram 360 shows a worst case timing diagram.

Ideal timing diagram 300 shows an ideal timing example where there is no propagation delay, for example, propagation delay due to a route on a PCB between a NAND Flash controller and NAND Flash storage. 2.5 ns after the falling edge of the read enable signal, data is output by a semiconductor device (such as NAND Flash storage 102 in FIG. 1) and is held steady for 5 nS. The amount of time a signal is held steady is referred to as a hold time specification. These two values define the start and duration of ideal data window 302, during which the data is guaranteed to be held steady and during which a sample should be taken in order for the system to operate properly. Rising edge 350 shows an example sampling point at which the data is sampled and the same sampling point (i.e., rising edge 350) is shown in the context of all three timing diagrams. As is shown in diagram 300, sampling occurs properly under ideal timing conditions since rising edge 350 overlaps with ideal timing window 302.

However, as can be seen in timing diagrams 330 and 360, the common sampling time (indicated by rising edge 350) is not guaranteed to meet timing constraints under best case and worst case timing conditions.

In best case timing diagram 330, propagation delay is accounted for using the best case (i.e., fastest) propagation times. As shown in that example, under best case conditions, it takes 2.2 ns for the read enable signal to propagate to the external slave device. To give an example of the underlying delays, there may be delay due to an output path which begins at the output of a read enable register (e.g., the Q pin of an internal flip-flop) and ends at the input of an I/O pad (e.g., the O pin of an I/O pad). Another contributor to propagation delay may be through the I/O pad itself (e.g., from the O pin to the I/O pin of an I/O pad). Another contributor may be the board route on a PCB from one semiconductor device to another (e.g., a board route between NAND Flash controller 100 and NAND Flash storage 102 in FIG. 1).

As a result of this propagation delay, the $RE_{EXT}$ signal is delayed by 2.2 ns in comparison with the $RE_{CTRL}$ signal. 2.5 ns after the falling edge of the read enable signal is observed by the external device (i.e., the $RE_{EXT}$ signal as opposed to the $RE_{CTRL}$ signal), data is output and held steady for 5 ns. This produces best case window 332. The data signal takes 1.5 ns to propagate from the external slave device to the logic that actually samples the signal (e.g., the propagation delay from NAND Flash storage 102 to data sampler 104 in FIG. 1). This is reflected in the 1.5 ns difference between $DATA_{EXT}$ and $DATA_{CTRL}$ and the example contributing propagation delays above (or some counterpart thereof) may also be present here. Note that rising edge 350 and best case window 332 do not overlap and thus proper functioning of the system cannot be guaranteed.

Timing diagram 360 accounts for the worst case (i.e., slowest) propagation delays. Under worst case timing conditions, it takes 4.0 ns of propagation delay for the read enable signal to propagate to the external slave device, hence the 4.0 ns delay between $RE_{CTRL}$ and $RE_{EXT}$. 2.5 ns after the falling edge of the $RE_{EXT}$ signal (i.e., the version of the read enable signal observed by the external slave device), data is output by the external slave device (see $DATA_{EXT}$). After a 2.5 ns propagation delay, the data arrives at the logic which samples the signal (note the 2.5 ns difference between $DATA_{EXT}$ and $DATA_{CTRL}$). However, since rising edge 350 does not overlap with best case window 362, it cannot be guaranteed that the value sampled is the requested data.

As shown in diagrams 330 and 360, using rising edge 350 as a common sampling point does not work across best case and worst case timing variations because that sampling time overlaps with neither best case window 332 nor worst case window 362.

Figure 4A:
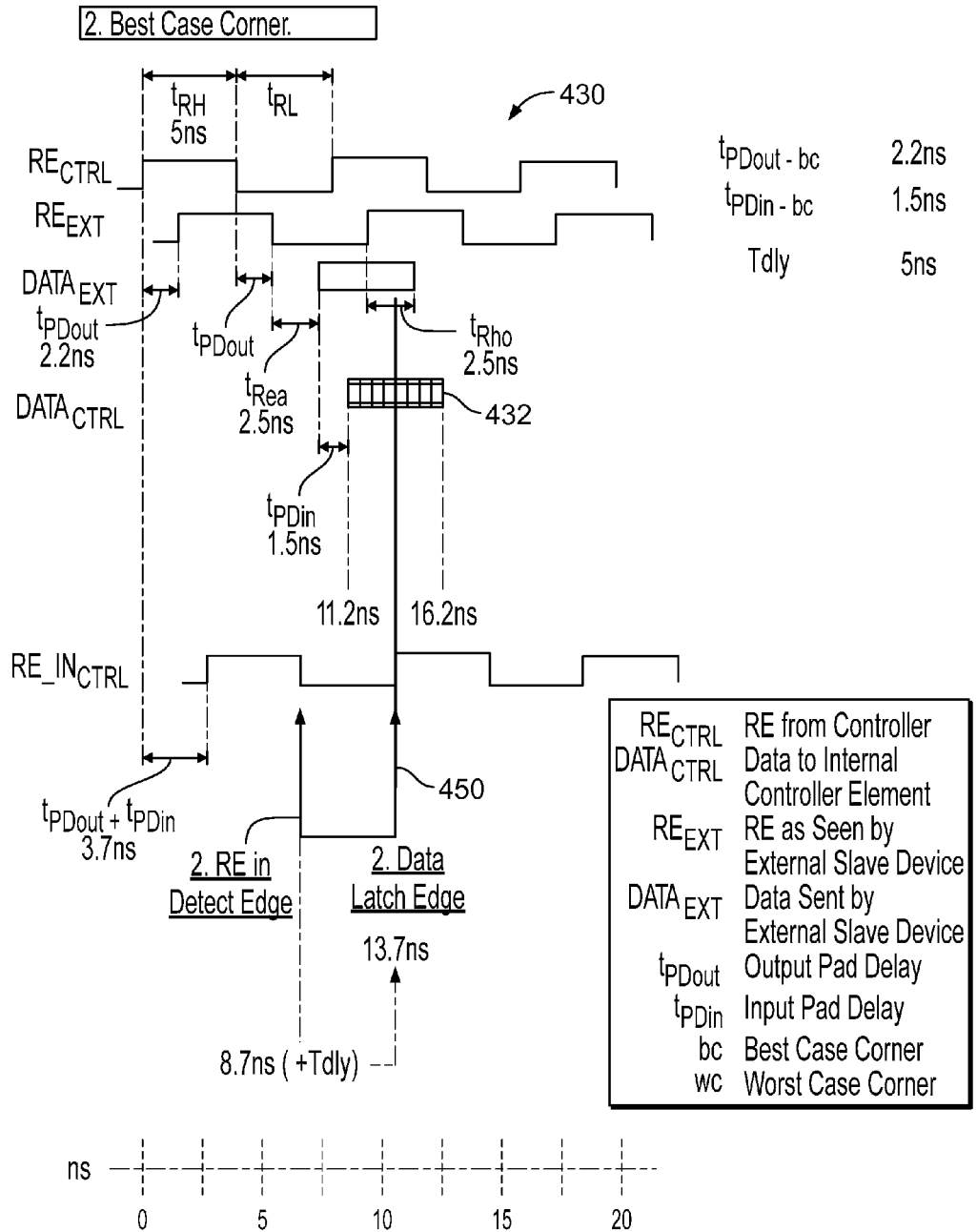
FIG. 4A shows an example timing diagram for best case propagation delays when sampling according to a read enable signal that includes at least some delay from an I/O pad.
Figure 4B:
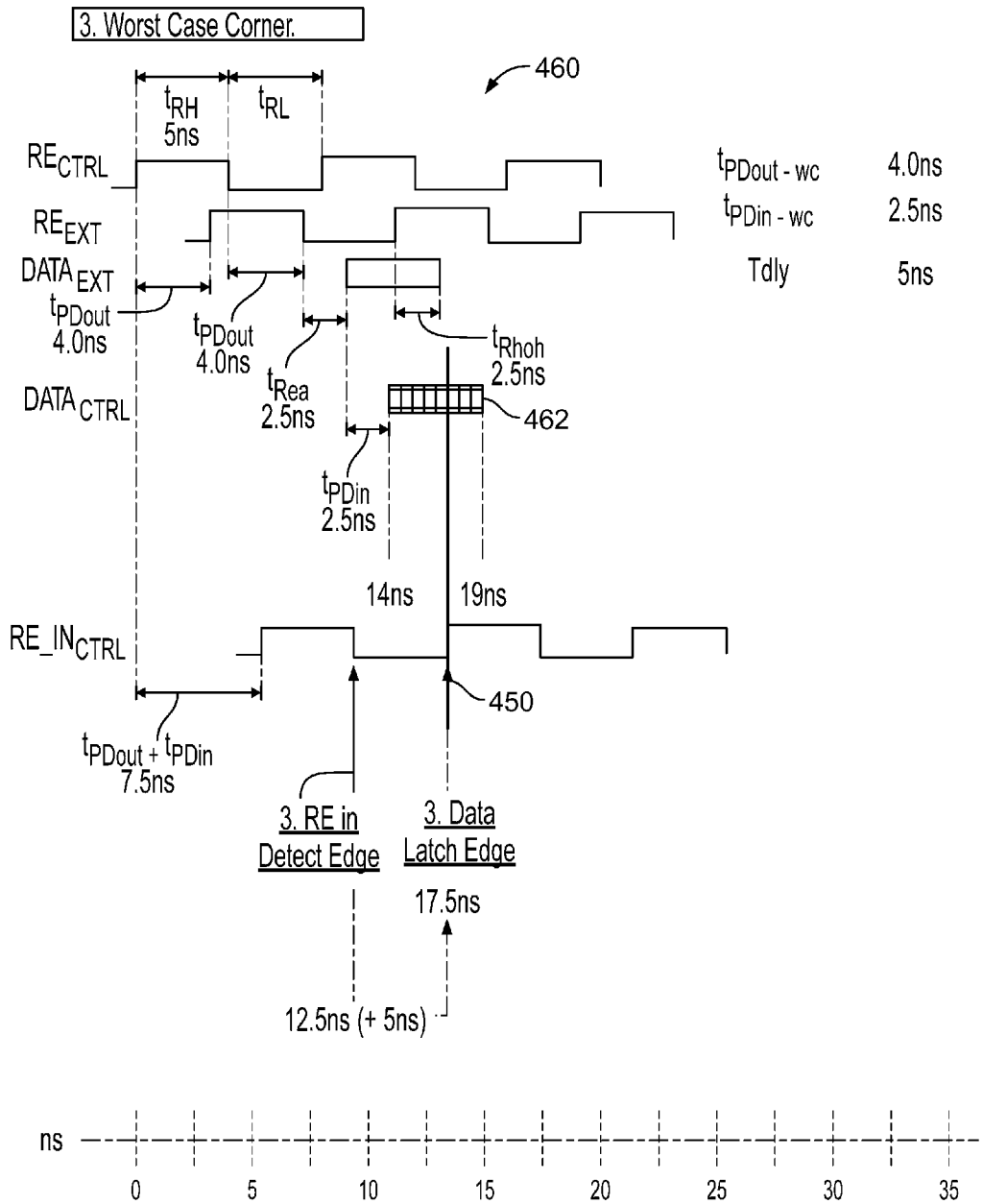
FIG. 4B shows an example timing diagram for worst case propagation delays when sampling according to a read enable signal that includes at least some delay from an I/O pad.

FIG. 4A shows an example timing diagram for best case propagation delays when sampling according to a read enable signal that includes at least some delay from an I/O pad. FIG. 4B shows an example timing diagram for worst case propagation delays when sampling according to a read enable signal that includes at least some delay from an I/O pad. In the example shown, diagram 430 shows best case (i.e., fastest) timing and diagram 460 shows worst case (i.e., slowest) timing. In best case timing diagram 430, there is a 2.2 ns propagation delay of the read enable signal from the controller to the external slave device, hence a 2.2 ns difference between RECTRL and REEXT. In response to the read enable signal observed by the external slave device (i.e., the REEXT signal), the external slave device outputs a data signal. The best case propagation delay of this signal is 1.5 ns, causing a delay of 1.5 ns between the DATAEXT signal and the DATACTRL signal. These best case propagation delays product best case window 432 which overlaps with rising edge 450, which is an example sampling point common to both best case timing diagram 430 and worst case timing diagram 460. Unlike rising edge 350 in FIG. 3B, rising edge 450 is based on the RE_INCTRL signal, which includes at least some I/O pad delay. Note that the RE_INCTRL signal may include other delays as well, for example due to wires or routing on a semiconductor die, or through internal buffers or other logic. Note that rising edge 450, based off of a read enable signal which includes at least some I/O pad delay, overlaps with best case window 432, hence the system will function properly.

Similarly, diagram 460 shows that using the rising edge of the $RE\_IN_{CTRL}$ signal (450) to sample data satisfies timing with worst case numbers. Under worse case conditions, the propagation delay of the read enable signal to the external slave device is 4.0 ns and the propagation delay of the data signal from the external slave device back to the logic that samples it is 2.5 ns. This produces a worst case window 462 which overlaps with rising edge 450. Since rising edge 450 overlaps with both best case window 432 and worst case window 462, it can be used as a common sampling time without any issues. Put another way, using rising edge 450 as the sampling edge guarantees proper operation, no matter if the device is operating at its fastest (i.e., best case corner) or its slowest (i.e., worst case corner).

The following diagrams give some examples of obtaining a read enable signal that includes at least some I/O pad delay and placement of the relevant I/O pads in a semiconductor device.

Figure 5:
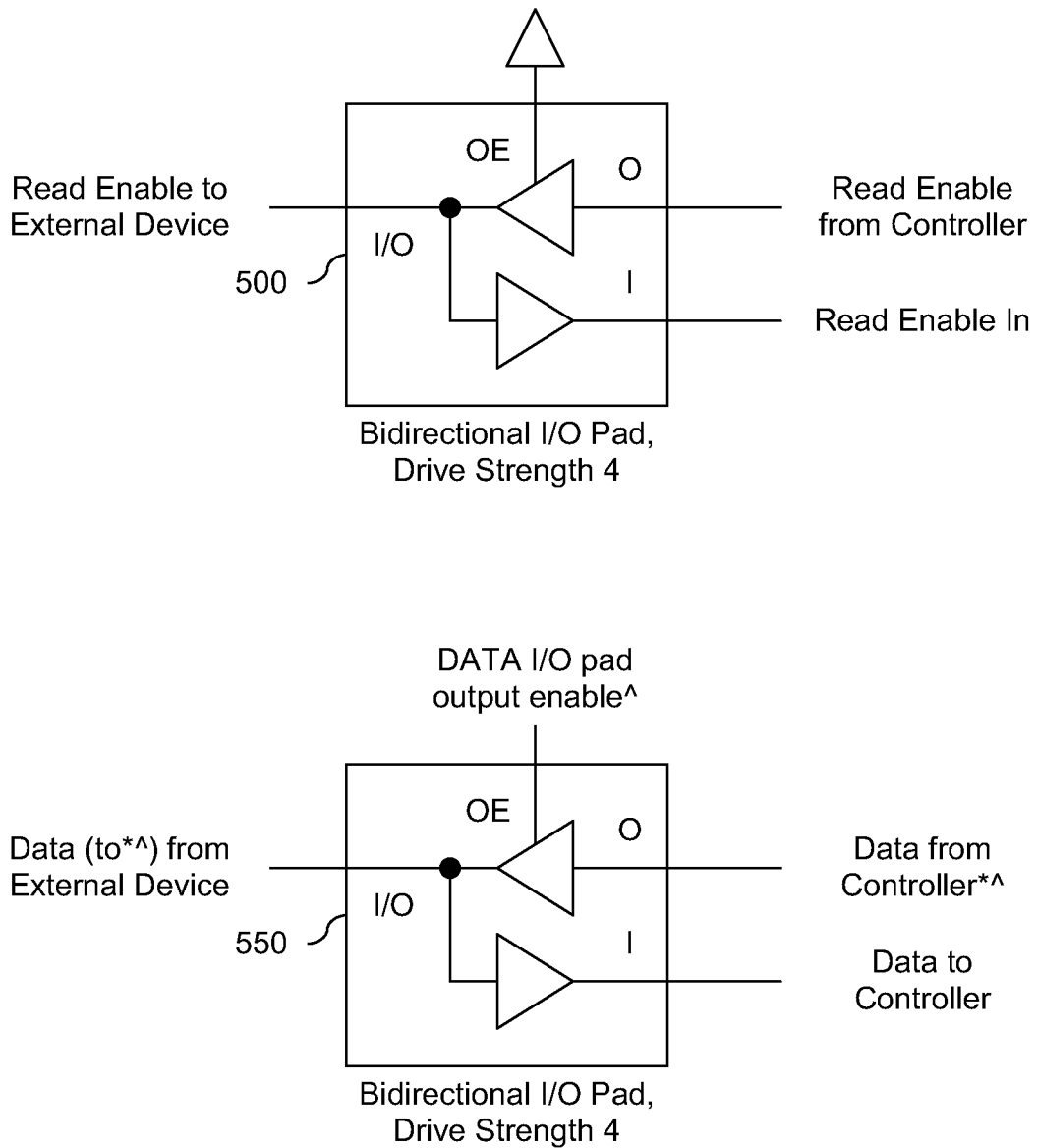
FIG. 5 is a diagram showing an embodiment of matching I/O pad direction type and drive strength.

FIG. 5 is a diagram showing an embodiment of matching I/O pad direction type and drive strength. For clarity, this example shows a single data signal or line but in some other embodiments a data signal is a data bus comprising multiple lines or bits and there are multiple data I/O pads (e.g., n+1 I/O pads for data bus [n:0]). Also for clarity, signal names from FIG. 1 are repeated where applicable.

Data I/O pad 550 is a bidirectional I/O pad with a drive strength of 4. Other drive strength examples include drive strengths of 1 and 2 where the delay through the pad tends to increase with drive strength. Bidirectional pads in this example have 4 pins: I, O, I/O and OE. The OE pin controls whether the I/O pad is in output or output mode. When the OE pin is set high (at least in this example), the bidirectional I/O pad is in output mode (i.e., the buffer the OE pin is connected to is turned on, causing the signal at the O pin to be output at the I/O pin). When set low, the bidirectional I/O pad is in input mode (i.e., the buffer the OE pin is connected to is turned off and does not drive the I/O pin, permitting the I/O pin to be driven by an external device).

Referring back to the signals shown in FIG. 1, the I pin of data I/O pad 550 is connected to the data to controller signal and the I/O pin is connected to the data from external device signal. An output enable signal not shown in FIG. 1 is connected to the OE pin of data I/O pad 550, configuring the direction as appropriate. When in write (i.e., output) mode, the signal connected to the I/O pin is a data to external device signal, which is not shown in FIG. 1.

The pad used for read enable I/O pad 500 is selected to match that of data I/O pad 550. Thus, the drive strengths (i.e., a drive strength of 4) and the direction (i.e., bidirectional) of the two pads match. Since the read enable I/O pad operates solely in output mode, the OE pin of pad 500 is tied high. Referring back to the signals shown in FIG. 1, the I/O pin is connected to the read enable to external device signal, the O pin is connected to the read enable from controller signal and the I pin is connected to the read enable in signal (i.e., a version of the read enable signal which includes at least some I/O pad delay).

In some embodiments, pads 500 and 550 are placed relatively close to each other on the perimeter of the semiconductor die. For example, this may mitigate process differences between the two. The timing closure technique herein attempts to match delays between the read enable path and the data path, and thus it may be desirable to minimize any differences in process by placing the related pads relatively close to each other on the semiconductor die. Process or manufacturing differences tend to be smaller when closer together on a semiconductor die and the largest process difference may be between the two furthest corners of a semiconductor die. Temperature and voltage may also be affected by distance. In some embodiments, there is a maximum I/O pad separation between the two that is specified. For example, at most 4 I/O pads can be placed between pads 500 and 550.

Figure 6:
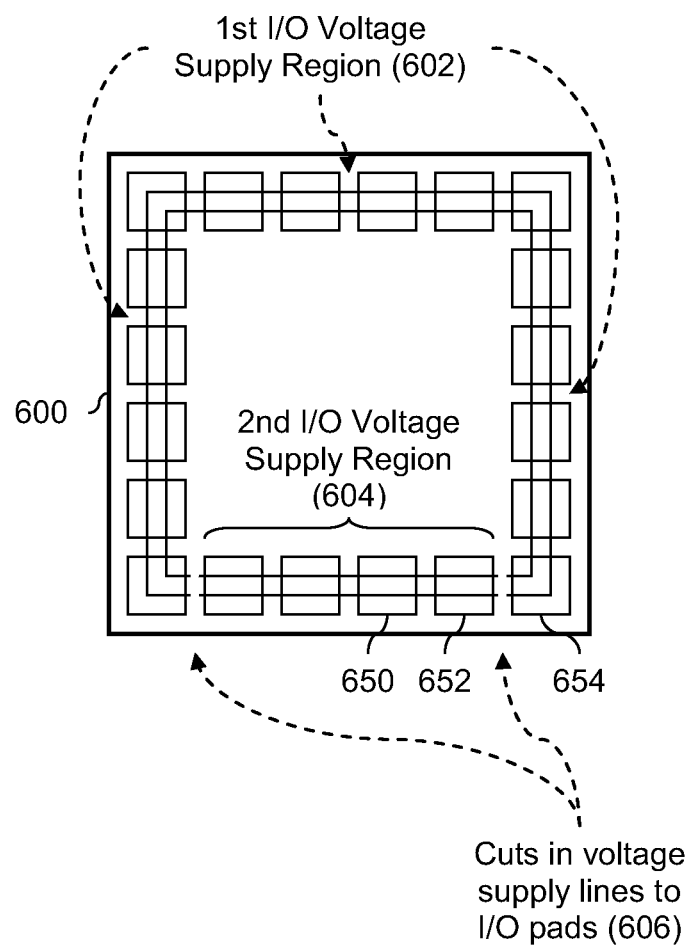
FIG. 6 is a diagram showing an embodiment of two I/O voltage supply regions in a semiconductor device.

FIG. 6 is a diagram showing an embodiment of two I/O voltage supply regions in a semiconductor device. In this example shown, power and ground are provided to each I/O pad in the semiconductor. Two cuts (606) have been made in the I/O voltage supply lines. Such cuts may be made for a variety of reasons, including noise isolation and/or different voltage supply requirements coexisting on the same semiconductor die (i.e., one group of I/O pads requires a 5V supply and another group requires a 3.3 V supply). Whatever the reason, such cuts create two I/O voltage supply regions: 602 and 604.

In some embodiments, a read enable I/O pad and a data I/O pad occupy I/O pads in the same I/O voltage supply region, such as I/O pads 650 and 652. This may mitigate on-die differences due to voltage differences, correspondingly reducing any difference in the delays through the two I/O pads. It may not be desirable to have read enable I/O pad occupy pad 654 and have data I/O pad occupy pad 654 because the difference in I/O voltage supplies may result in timing differences between the two I/O pads. To illustrate, suppose slight differences between the two I/O voltage supply regions cause pad 652 to be supplied with 3.4 V and pad 654 to be supplied with 3.2V. Pad 652 would run faster than pad 654.

Although the previous figures show a read enable signal with delay from a single I/O pad, some embodiments use multiple I/O pads. The following figure shows such an example.

Figure 7:
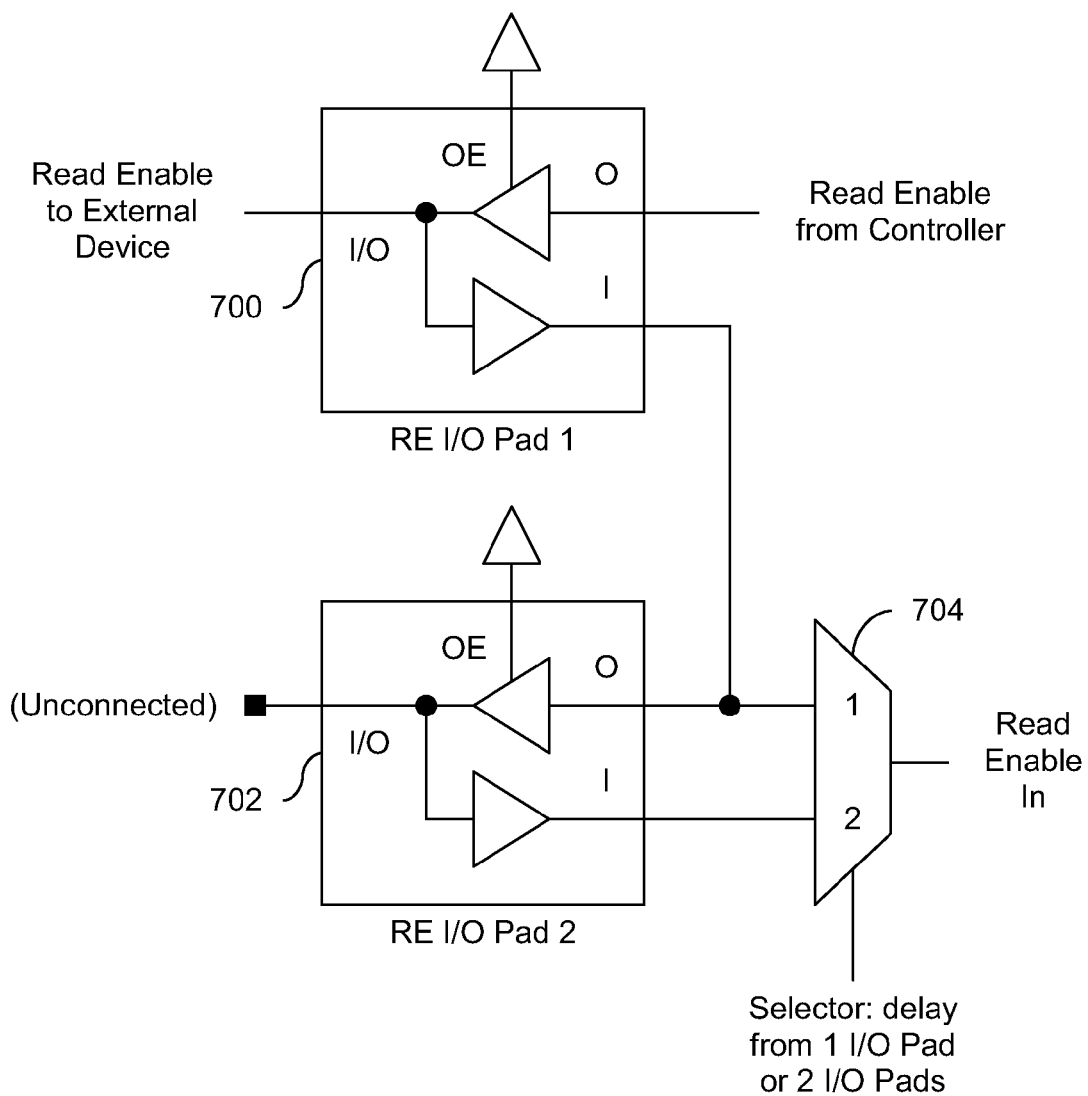
FIG. 7 is a diagram showing an embodiment of a configurable system where a read enable signal with delay from either a single I/O pad or two I/O pads is selected.

FIG. 7 is a diagram showing an embodiment of a configurable system where a read enable signal with delay from either a single I/O pad or two I/O pads is selected. For clarity, the same signal names from FIG. 1 are shown. In the example shown, the O pin of I/O pad 700 is connected to the read enable from controller signal and the I/O pin of I/O pad 700 is connected to the read enable to external device signal. The I pin of I/O pad 700 is connected to the O pin of I/O pad 702. The I/O pin of I/O pad 702 is (at least in this example) left unconnected. For example, the I/O pin of I/O pad 702 may not necessarily be connected up to a bond wire which goes to the exterior of the package, thus permitting it to be driven by the I pin of I/O pad 700. The OE pins of pads 700 and 702 are tied high in this example.

Multiplexer 704 is used to select between a version of the read enable signal with delay from a single I/O pad versus one with delay from two I/O pads. One input of multiplexer 704 comes from the I pin of I/O pad 700 and the other input comes from the I pin of I/O pad 702. Depending upon how much I/O pad delay is desired, the select signal of multiplexer 704 is set accordingly. In some embodiments, the select pin is connected to a register which is programmed during system configuration (e.g., by a manufacturer before sale to or use by a consumer or other end user).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for sampling a data signal, comprising:
at a first semiconductor device, generating a read enable signal intended for a second semiconductor device;
generating a read enable signal with at least some I/O pad delay included, including by passing the read enable signal intended for the second semiconductor device at least partially through an input/output (I/O) pad on the first semiconductor device, wherein passing the read enable signal through the I/O pad includes passing the read enable signal intended for the second semiconductor device at least partially through two or more I/O pads on the first semiconductor device; and
at the first semiconductor device, sampling a data signal from the second semiconductor using the read enable signal with at least some I/O pad delay included.

2. The method recited in claim 1, wherein the second semiconductor device includes NAND Flash storage.

3. The method recited in claim 1, wherein the first semiconductor device includes one or more of the following: an application-specific integrated circuit (ASIC), a field-programmable gate array (FPGA) or a microprocessor.

4. The method recited in claim 1, wherein:
the I/O pad through which the read enable signal is passed has a drive strength; and
the drive strength of the I/O pad matches that of a second I/O pad through which the data signal from the second semiconductor is passed.

5. The method recited in claim 1, wherein:
the I/O pad through which the read enable signal is passed has a direction type; and the direction type of the I/O pad matches that of a second I/O pad through which the data signal from the second semiconductor is passed.

6. The method recited in claim 1, wherein the I/O pad through which the read enable signal is passed is located on the first semiconductor device adjacent to a second I/O pad through which the data signal from the second semiconductor is passed.

7. The method recited in claim 1, wherein:
there are a plurality of I/O voltage supply regions on the first semiconductor device; and
the I/O pad through which the read enable signal is passed is located in a same I/O voltage supply region on the first semiconductor device as a second I/O pad through which the data signal from the second semiconductor is passed.

8. The method recited in claim 1, wherein generating the read enable signal with at least some I/O pad delay included includes selecting between (1) a first read enable signal obtained by passing the read enable signal intended for the second semiconductor device at least partially through a first number of I/O pads on the first semiconductor device and (2) a second read enable signal obtained by passing the read enable signal intended for the second semiconductor device at least partially through a second number of I/O pads on the first semiconductor device, wherein the first number of I/O pads does not equal the second number of I/O pads.

9. A system for sampling a data signal, comprising:
a first semiconductor device, comprising:
a signal generator configured to:
at the first semiconductor device, generate a read enable signal intended for a second semiconductor device; and
generate a read enable signal with at least some I/O pad delay included, including by passing the read enable signal intended for the second semiconductor device at least partially through an input/output (I/O) pad on the first semiconductor device, wherein the signal generator is configured to pass the read enable signal through the I/O pad by passing the read enable signal intended for the second semiconductor device at least partially through two or more I/O pads on the first semiconductor device; and
a signal sampler configured to: at the first semiconductor device, sample a data signal from the second semiconductor using the read enable signal with at least some I/O pad delay included.

10. The system recited in claim 9, wherein the second semiconductor device includes NAND Flash storage.

11. The system recited in claim 9, wherein the first semiconductor device includes one or more of the following: an application-specific integrated circuit (ASIC), a field-programmable gate array (FPGA) or a microprocessor.

12. The system recited in claim 9, wherein:
the I/O pad through which the read enable signal is passed has a drive strength; and
the drive strength of the I/O pad matches that of a second I/O pad through which the data signal from the second semiconductor is passed.

13. The system recited in claim 9, wherein:
the I/O pad through which the read enable signal is passed has a direction type; and
the direction type of the I/O pad matches that of a second I/O pad through which the data signal from the second semiconductor is passed.

14. The system recited in claim 9, wherein the I/O pad through which the read enable signal is passed is located on the first semiconductor device adjacent to a second I/O pad through which the data signal from the second semiconductor is passed.

15. The system recited in claim 9, wherein:
there are a plurality of I/O voltage supply regions on the first semiconductor device; and
the I/O pad through which the read enable signal is passed is located in a same I/O voltage supply region on the first semiconductor device as a second I/O pad through which the data signal from the second semiconductor is passed.

16. The system recited in claim 9, wherein the signal generator is configured to generate the read enable signal with at least some I/O pad delay included by selecting between (1) a first read enable signal obtained by passing the read enable signal intended for the second semiconductor device at least partially through a first number of I/O pads on the first semiconductor device and (2) a second read enable signal obtained by passing the read enable signal intended for the second semiconductor device at least partially through a second number of I/O pads on the first semiconductor device, wherein the first number of I/O pads does not equal the second number of I/O pads.

17. A computer program product for sampling a data signal, the computer program product being embodied in a non-transitory computer readable storage medium and comprising computer instructions for:
at a first semiconductor device, generating a read enable signal intended for a second semiconductor device;
generating a read enable signal with at least some I/O pad delay included, including by passing the read enable signal intended for the second semiconductor device at least partially through an input/output (I/O) pad on the first semiconductor device, wherein passing the read enable signal through the I/O pad includes passing the read enable signal intended for the second semiconductor device at least partially through two or more I/O pads on the first semiconductor device; and
at the first semiconductor device, sampling a data signal from the second semiconductor using the read enable signal with at least some I/O pad delay included.

18. The computer program product recited in claim 17, wherein:
the I/O pad through which the read enable signal is passed has a drive strength; and
the drive strength of the I/O pad matches that of a second I/O pad through which the data signal from the second semiconductor is passed.

19. The computer program product recited in claim 17, wherein:
there are a plurality of I/O voltage supply regions on the first semiconductor device; and
the I/O pad through which the read enable signal is passed is located in a same I/O voltage supply region on the first semiconductor device as a second I/O pad through which the data signal from the second semiconductor is passed.

20. The computer program product recited in claim 17, wherein the computer instructions for generating the read enable signal with at least some I/O pad delay included include computer instructions for selecting between (1) a first read enable signal obtained by passing the read enable signal intended for the second semiconductor device at least partially through a first number of I/O pads on the first semiconductor device and (2) a second read enable signal obtained by passing the read enable signal intended for the second semiconductor device at least partially through a second number of I/O pads on the first semiconductor device, wherein the first number of I/O pads does not equal the second number of I/O pads.

* * * * *